United States Patent
Kim et al.

(10) Patent No.: US 7,826,423 B2
(45) Date of Patent: *Nov. 2, 2010

(54) METHOD FOR HANDOVER BETWEEN ASYNCHRONOUS COMMUNICATION NETWORK AND SYNCHRONOUS COMMUNICATION NETWORK

(75) Inventors: Young-Lak Kim, Yongin-si (KR); Sung-Ho Shin, Seoul (KR); Jong-Tae Ihm, Seongnam-si (KR)

(73) Assignee: SK Telecom Co., Ltd., Seoul (KR)

( * ) Notice: Subject to any disclaimer, the term of this patent is extended or adjusted under 35 U.S.C. 154(b) by 950 days.

This patent is subject to a terminal disclaimer.

(21) Appl. No.: 10/585,303

(22) PCT Filed: Jan. 5, 2005

(86) PCT No.: PCT/KR2005/000023

§ 371 (c)(1),
(2), (4) Date: Jan. 19, 2007

(87) PCT Pub. No.: WO2005/067176

PCT Pub. Date: Jul. 21, 2005

(65) Prior Publication Data

US 2007/0258405 A1    Nov. 8, 2007

(51) Int. Cl.
*H04W 4/00* (2009.01)
(52) U.S. Cl. .......... 370/331; 370/310; 370/350; 370/328; 455/436; 455/438; 455/439; 455/442; 455/443
(58) Field of Classification Search ............... 455/436, 455/438–444; 370/331, 310, 328, 350
See application file for complete search history.

(56) References Cited

U.S. PATENT DOCUMENTS 6,704,581 B1 * 3/2004 Park et al. ............... 455/553.1

(Continued)

FOREIGN PATENT DOCUMENTS

EP    1104974    6/2001

(Continued)

OTHER PUBLICATIONS

International Search Report dated Apr. 18, 2005 for PCT/KR2005/000023.

(Continued)

*Primary Examiner*—Wayne Cai
(74) *Attorney, Agent, or Firm*—Lowe Hauptman Ham & Berner LLP (57) ABSTRACT

In the handover method, a radio network controller periodically measures the wireless environment of a mobile communication terminal, determines whether handover is required, and informs the asynchronous mobile switching center of the asynchronous communication system that the handover is required. The asynchronous mobile switching center requests the handover and a synchronous mobile switching center assigns a forward channel to the mobile communication terminal. The mobile communication terminal prepares for communication with a synchronous mobile communication system according to the direction of the asynchronous mobile switching center, and causes a backward channel with respect to the synchronous communication system to be assigned to the mobile communication terminal. The synchronous mobile switching center informs the asynchronous mobile switching center that handover has been completed, and causes a connection between the asynchronous mobile switching center and the radio network controller to be released.

6 Claims, 6 Drawing Sheets

U.S. PATENT DOCUMENTS

| | | | |
|---|---|---|---|
| 6,975,608 B1 * | 12/2005 | Park et al. | 370/332 |
| 2003/0002525 A1 | 1/2003 | Grilli et al. | |
| 2003/0108007 A1 * | 6/2003 | Holcman et al. | 370/331 |
| 2003/0190916 A1 * | 10/2003 | Celedon et al. | 455/437 |

FOREIGN PATENT DOCUMENTS

| | | |
|---|---|---|
| EP | 1213941 | 6/2002 |
| JP | 2001-186552 | 7/2001 |
| KR | 1020010046905 | 6/2001 |
| WO | 03/079716 | 9/2003 |
| WO | WO 03/073773 | 9/2003 |

OTHER PUBLICATIONS

The First Examination Report dated Mar. 20, 2009, for Indian application No. 1739/KONLNP/2006.

* cited by examiner

METHOD FOR HANDOVER BETWEEN ASYNCHRONOUS COMMUNICATION NETWORK AND SYNCHRONOUS COMMUNICATION NETWORK

CROSS REFERENCE TO RELATED APPLICATION

This application is the National Phase application of International Application No. PCT/KR2005/000023, filed Jan. 6, 2005, which designates the United States and was published in English. This application, in its entirety, is incorporated herein by reference.

TECHNICAL FIELD

The present invention relates to a handover method for a mobile communication terminal in a mobile communication network, in particularly, to a handover method for a mobile communication terminal in a mobile communication network in which an asynchronous network and a synchronous network overlap each other.

BACKGROUND ART

International Mobile Telecommunication (IMT)-12000 systems aim to solve the problem of global roaming between mobile communication systems, and are classified into a Code Division Multiple Access (CDMA) 2000-based synchronous system and a Wideband Code Division Multiple Access (WCDMA)-based asynchronous system.

A CDMA2000-based synchronous mobile communication system is implemented to cover a wide area, and is advantageous in that a maximal data rate of 2.4 Mbps can be obtained in a forward direction when an Evolution Data Only (EV-DO) scheme is applied thereto. However, since the data rate varies greatly with the wireless environment, the CDMA-based synchronous mobile communication system is disadvantageous in that it is not appropriate for services, such as a video phone service, for which Quality of Service (QoS) must be guaranteed.

In contrast, a WCDMA-based asynchronous mobile communication system is advantageous in that it is appropriate for real-time services, such as a video phone service, because a circuit switching is supported, so that high-speed mobility is supported and the QoS thereof is excellent. However, since the investment cost is excessive at the early stage of commercialization, the WCDMA-based asynchronous mobile communication system is disadvantageous in that it is difficult to provide a service covering the entire area in which a synchronous mobile system is established.

Accordingly, in the early IMT-2000 system, a service is provided in a form in which synchronous and asynchronous mobile communication systems coexist. For this purpose, a multi-mode mobile communication terminal is required. In this case, when the synchronous mobile communication system is used for voice and high-speed Internet access services and the asynchronous mobile communication system is used for services, such as a video phone service, for which QoS must be guaranteed, the advantages of both systems can be maximized.

Meanwhile, a multi-mode mobile communication terminal for supporting these advantages, that is, a Dual Band Dual Mode (DBDM) mobile communication terminal that can be used both in a synchronous type system and in an asynchronous type system has been developed. By using the mobile communication terminal, different services can be used in a synchronous system area and an asynchronous system area.

In the case of the DBDM mobile communication terminal, since the lifespan of a battery charge is greatly shortened due to considerable power consumption when two modem clips, which are contained therein, are used, only one of the two modem chips should be operated. Accordingly, the DBDM mobile communication terminal is selectively connected to the synchronous mobile communication system and the asynchronous mobile communication system.

In a mobile communication environment implemented such that an asynchronous mobile communication system overlaps a synchronous mobile communication system, call drops may occur in a border region between synchronous and asynchronous areas. Furthermore, in the case where a user moves between a synchronous mobile communication system and an asynchronous mobile communication system, handover between the systems is required to provide continuous service. However, a handover method between asynchronous and synchronous mobile communication systems has not yet been defined. If the handover method is not defined, there occurs a disadvantage in that vast costs are required for the implementation of the asynchronous mobile communication system.

Furthermore, when a mobile communication terminal is located in the border region between synchronous and asynchronous areas even though handover is supported, it must be possible to search for a synchronous mobile communication system. This case is problematic in that, since the two modem chips contained in the mobile communication terminal must both operate, interference may be induced therebetween, and the power consumption of the mobile communication terminal is increased.

DISCLOSURE OF THE INVENTION

The present invention has been made keeping in mind the above problems occurring in the prior art, and an object of the present invention is to provide a method for handover which is capable of reducing costs required to implement an asynchronous mobile communication system by defining a handover method between an asynchronous mobile communication system and a synchronous mobile communication system, and preventing a call drop phenomenon caused by the movement of mobile communication terminals in a mobile communication system in which asynchronous and synchronous mobile communication systems coexist.

BEST MODE FOR CARRYING OUT THE INVENTION

The present invention provides a handover method between asynchronous and synchronous mobile communication systems for a Dual Band Dual Mode (DBDM) mobile communication terminal in a mobile communication network in which the asynchronous and synchronous mobile communication systems overlap each other, the mobile communication terminal having an asynchronous modem unit and a synchronous modem unit, including the first step of the radio network controller of the asynchronous mobile communication system periodically measuring a wireless environment around the mobile communication terminal; the second step of the radio network controller determining whether handover is required using a blind decision method when wireless environment measurement value is less than predetermined threshold value, and informing an asynchronous mobile switching center of the asynchronous communication system that the handover is required; the third step of the asynchronous mobile switching center requesting handover from the synchronous mobile switching center of the synchronous communication system, and the synchronous mobile switching center assigning a forward channel to the mobile communication terminal; the fourth step of, as the asynchronous mobile switching center directs the mobile communication terminal to perform handover, the mobile communication terminal preparing communication with the synchronous mobile communication system, and causing a backward channel with respect to the synchronous communication system to be assigned to the mobile communication terminal; and the fifth step of the synchronous mobile switching center informing the asynchronous mobile switching center of completion of the handover, thus releasing a connection between the asynchronous mobile switching center and the radio network controller.

An embodiment of the present invention is described in more detail with reference to the accompanying drawings below.

Figure 1:
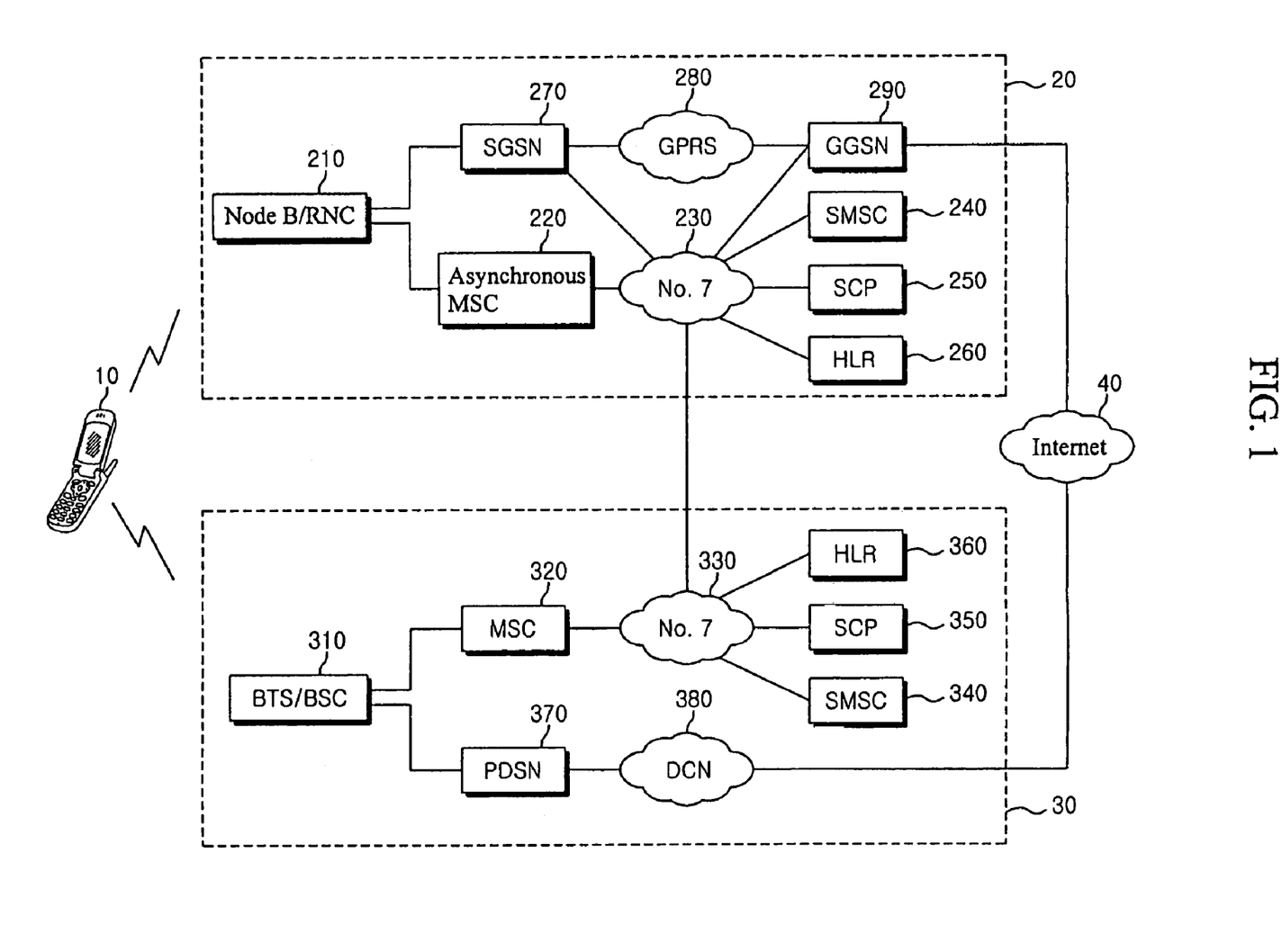
FIG. 1 is a diagram showing the construction of a mobile communication network to which the present invention is applied.

FIG. 1 is a diagram showing the construction of a mobile communication network to which the present invention is applied.

A mobile communication terminal 10 that is applied to the present invention is a DBDM mobile communication terminal. The DBDM mobile communication terminal 10 can be selectively and wirelessly connected to an asynchronous mobile communication system 20 and a synchronous mobile communication system 30 and uses voice and data services, which will be described in detail later.

The asynchronous mobile communication system 20 includes a node B/Radio Network controller (RNC) 210 composed of a node B, that is, a base station for communicating with the mobile communication terminal 10 in a wireless region and a RNC for controlling the node B, an asynchronous Mobile Switching Center (MSC) 220 connected to the node B/RNC 210 to perform call switching so as to provide services to the mobile communication terminal 10, a Short Message Service Center (SMSC) 240 connected to the asynchronous MSC 220 through No. 7 common signaling network 230, a Service Control Point (SCP) 250, a Home Location Register (HLR) 260, a Serving GPRS Support Node (SGSN) 270 connected between the node B/RNC 210 and a General Packet Radio Service (GPRS) network 280 to maintain the location track of the mobile communication terminal 10 and to perform access control and a security function, and a Gateway GPRS Support Node (GGSN) 290 connected to the SGSN 270 through the GPRS network 280 and connected to the No. 7 common signaling network 230, to support operation in conjunction with external packets through the Internet 40.

Furthermore, the synchronous mobile communication system 30 includes BTS/BSC 310 composed of a Base Transceiver System (BTS) for supporting communication with the mobile communication terminal 10 in a wireless region and a Base Station Controller (BSC) for controlling the BTS, a MSC 320 connected with one or more BSCs to perform call switching, an SMSC 340 connected to the MSC 320 through a No. 7 common signaling network 330, an SCP 350, an HLR 360, a Packet Data Service Node (PDSN) 370 connected to the BSC to provide subscribers with packet data services, and a Data Core Network (DCN) 380 for supporting connection between the PDSN 370 and the Internet 40.

The MSC 220 of the asynchronous mobile communication system 20 and the MSC 320 of the synchronous mobile communication system 30 are connected to each other via the No. 7 common signaling networks 230 and 330, and transmit and receive information required for handover of the mobile communication terminal 10. Furthermore, the HLRs 260 and 360 may be implemented using dual stack HLRs, and store and manage subscribers' information, the usage state of supplementary services, etc., and provide the subscribers' information according to the requests of the MSC 220 and 320.

In such a system environment, as a mobile communication terminal, which is making a voice call in an asynchronous mobile communication system area, moves to a synchronous mobile communication system area, the asynchronous mobile communication system 20 determines whether handover is required based on the wireless environment in which the mobile communication terminal 10 is located. That is, the handover determination for the mobile communication terminal is made by a blind decision method. In this case, a Round Trip Delay (RTD) value and a Block Error Rate (BLER) may be applied as the wireless environment Handover threshold values with respect to the wireless environment measurement values are determined by a manager, and may be changed through an Element Management System (EMS).

As describe above, when the mobile communication system 20 directly determines the handover regardless of the wireless environment measurement values of the mobile communication terminal 10, the handover can be performed even though additional messages, which must be transmitted for handover between the mobile communication terminal 10 and the asynchronous mobile communication system 20, are not separately defined.

The reason why the handover is determined by the wireless environment measurement values in the present invention is described below. In the case where a general handover method is applied, the mobile communication terminal 10 must measure the wireless environment, such as the pilot signal intensity of the synchronous mobile communication system 30, and notify the asynchronous mobile communication system 20 of the measured wireless environment (mobile assistant handover method). For this purpose, the synchronous modem chip and asynchronous modem chip of the mobile communication terminal must be implemented in an integrated one-chip form and, therefore, a structural change of the mobile communication terminal 10 is required. Furthermore, in this case, messages, which must be transmitted between the mobile communication terminal 10 and the asynchronous mobile communication system 20 to perform handover, must be additionally defined. Since international standards must be modified if such new messages are defined, a considerable problem occurs in roaming mobile communication terminals.

Accordingly, when the mobile communication terminal 10 does not measure the intensity of a pilot signal received from the synchronous mobile communication system 30 but the asynchronous mobile communication system 20 determines the handover based on the wireless environment in which the mobile communication terminal 10 is located, whether the handover is required can be determined without a structural change of the mobile communication terminal 10.

The asynchronous mobile communication system 20 determines whether the handover to the synchronous mobile communication system is required by the above-described method, and requests the handover from the synchronous mobile communication system 30 when it is required.

Accordingly, the synchronous mobile communication system 30 assigns a forward channel to the mobile communication terminal 10, and the asynchronous MSC 220 directs the mobile communication terminal 10 to perform the handover to the synchronous mobile communication system area. As a result, the mobile communication terminal 10 prepares communication with the synchronous mobile communication system 30, and a backward channel is assigned therebetween.

Thereafter, when the synchronous mobile communication system 30 notifies the completion of the handover to the asynchronous mobile communication system, the asynchronous mobile communication system 20 releases the connection with the mobile communication terminal 10, thus completing the handover to the asynchronous mobile communication system 20.

Figure 2:
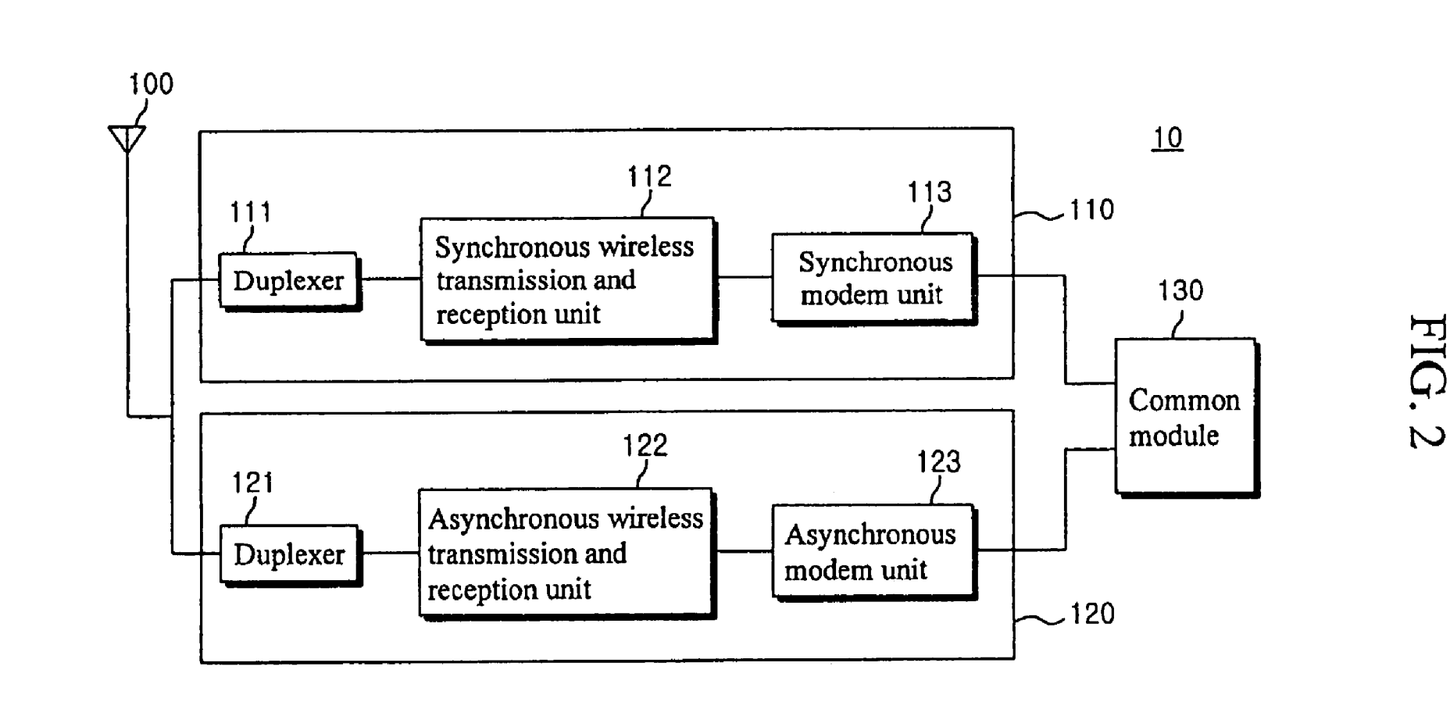
FIG. 2 is a diagram showing the construction of a mobile communication terminal that is applied to the present invention.

FIG. 2 is a diagram showing the construction of a mobile communication terminal that is applied to the present invention.

As shown in FIG. 2, the DBDM mobile communication terminal 10 includes an antenna 100, a synchronous module 110 for a synchronous mobile communication service, an asynchronous module 120 for an asynchronous mobile communication service, and a common module 130.

The antenna 100 has a function of processing both a frequency band for a synchronous mobile communication service and a frequency band for an asynchronous mobile communication service.

The synchronous module 110 includes a duplexer 111 operating as a band-pass filter for separately processing frequencies, a synchronous radio transmission and reception unit 112 for dividing transmission and reception radio waves into predetermined frequency bands, and a synchronous modem unit 113 for processing a wireless protocol with respect to the synchronous mobile communication system. The asynchronous module 120 includes a duplexer 121 operating as a bandpass filter for separately processing frequencies, an asynchronous radio transmission and reception unit 122 dividing transmission and reception radio waves into predetermined frequency bands, and an asynchronous modem unit 123 processing a wireless protocol with respect to the asynchronous mobile communication system.

The common module 130 operates as a central processing unit for controlling the synchronous modem unit 113 and the asynchronous modem unit 123, and includes an application processor for performing a multimedia function, memory, input and output units, and some other application processing units.

Furthermore, the DBDM mobile communication terminal 10 is equipped with software for providing a user interface, a supplementary service, mobility management, access/session control, resource control and protocol processing, so that the software allows the user to use a variety of services, performs handover and converts protocols to fit the mobile communication systems.

In the present invention, the DBDM mobile communication terminal 10 includes the synchronous module 110 and the asynchronous module 120. In the case where handover is required because the DBDM mobile communication terminal 10 moves to a synchronous area while making a voice call through the asynchronous module 120 in an asynchronous area, the asynchronous mobile communication system 20 determines the handover according to die wireless environment in which the mobile communication terminal 10 is located, so that it is not required to drive the synchronous module 110 along with the asynchronous module 120 and implement them in an integrated one-chip form.

Figure 3:
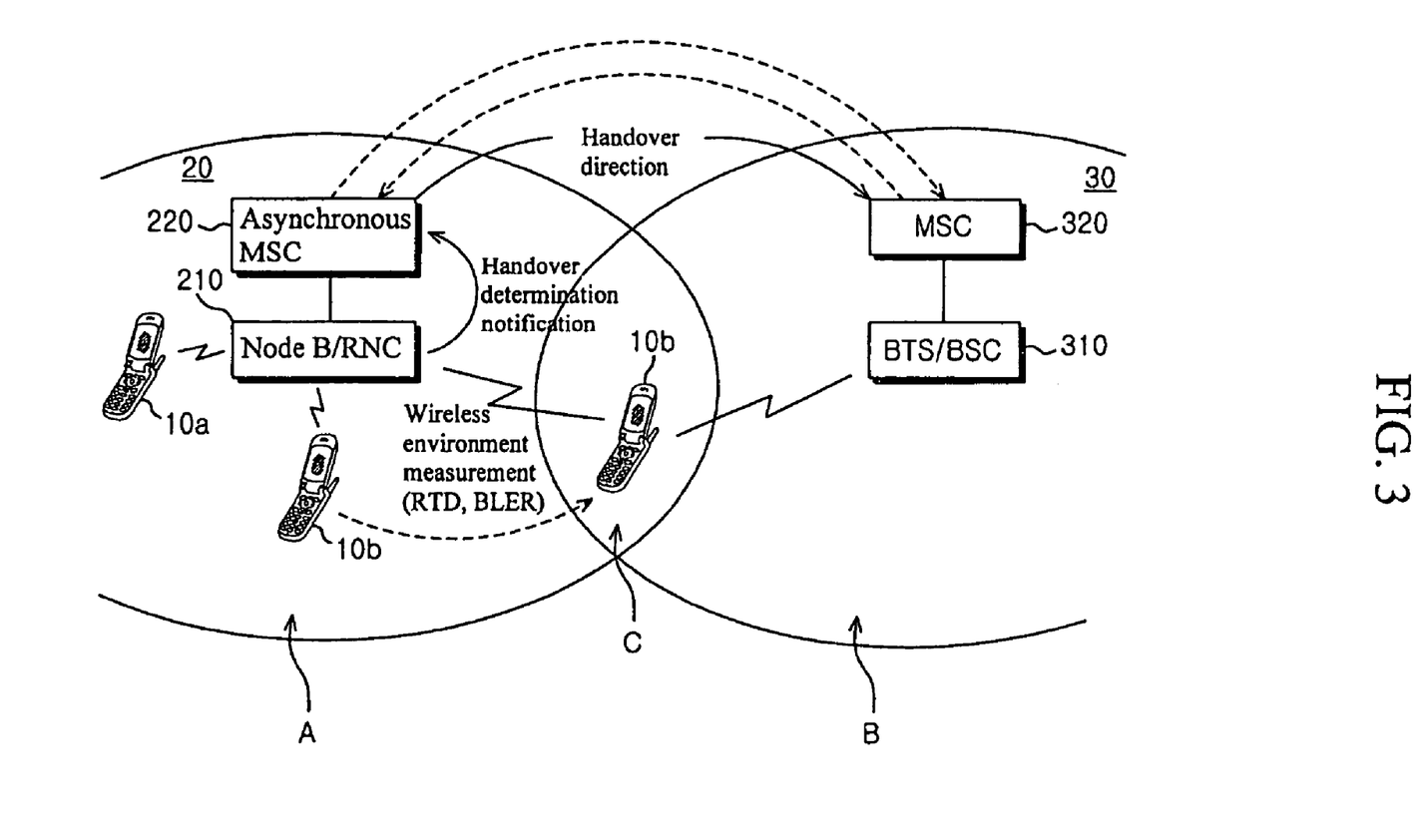
FIG. 3 is a conceptual diagram illustrating handover in a mobile communication network on which asynchronous and synchronous networks overlap each other according to an embodiment of the present invention
Figure 4:
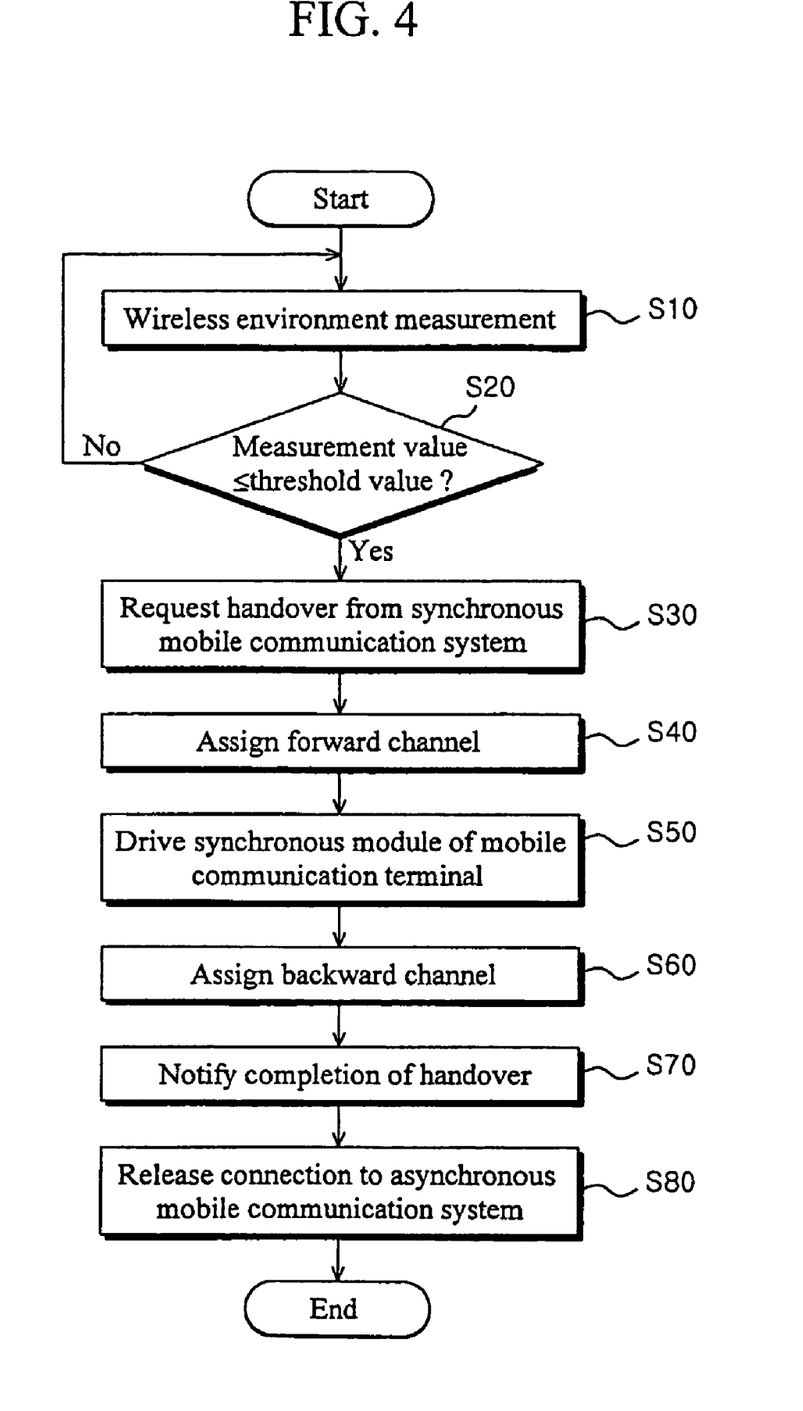
FIG. 4 is a flowchart illustrating a handover method according to an embodiment of the present invention.

FIG. 3 is a conceptual diagram showing handover in a mobile communication network on which asynchronous and synchronous networks overlap each other, and FIG. 4 is a flowchart illustrating a handover method according to an embodiment of the present invention.

To support handover according to the present invention, the node B/RNC 210 periodically measures the wireless environments of mobile communication terminals 10a and 10b at step S10.

As shown in FIG. 3, as the mobile communication terminal 10b, which is performing a voice call with the mobile communication terminal 10a in the area A of the asynchronous mobile communication system 20, moves to the border region C between the area A of the asynchronous mobile communication system 20 and the area B of the synchronous mobile communication system 30, the node B/RNC 210 checks whether wireless environment measurement values in a area in which the mobile communication terminal 10b is currently located are less than predetermined threshold values at step S20, and informs the asynchronous MSC 220 that handover is required when the measurement values are less than the predetermined threshold values according to the blind decision method. In this case, the RNC stores information on cells adjacent to the node B and a plurality of base stations in a database, and transmits information on a mobile communication terminal 10b, for which handover is required, along with information on adjacent base stations, when it is determined that handover is required.

In this case, a RTD value and a BLER may be applied as the wireless environment. The handover threshold values with respect to the wireless environment measurement values are determined by a manager, and may be changed through the EMS. The RTD is the time taken for the node B to transmit a message to the mobile communication terminal 10b and to receive an acknowledgment message from it, and an increase in this value signifies to the deterioration of the wireless environment. And, the BLER is used to determine the ratio of the total number of transmitted blocks to the number of error blocks in such a way that the node B transmits a plurality of data blocks to the mobile communication terminal and determines whether errors exist based on the blocks received from the mobile communication terminal 10b in response to the transmission of the data blocks. An increase in this value signifies to the deterioration of the wireless environment.

Accordingly, the asynchronous MSC 220 requests handover to the MSC 320 of the synchronous mobile communication system 30 at step S30 and, therefore, the MSC 320 assigns a forward channel to the mobile communication terminal 10b at step S40. Furthermore, as the asynchronous MSC 220 directs the mobile communication terminal 10b to perform the handover, the mobile communication terminal 10b prepares communication with the synchronous mobile communication system 30 by driving the synchronous module 110 at step S50, and allows a backward channel to be assigned to the mobile communication terminal 10b by transmitting a backward frame to the BTS/BSC 310 of the synchronous mobile communication system 30 when the preparation of communication has been completed, at step S60.

Thereafter, the synchronous MSC 320 informs the asynchronous MSC 220 of the completion of the handover at step S70, and the asynchronous MSC 220 requests the node B/RNC 210 to release the connection at step 80, thus allowing the connection with the asynchronous mobile communication system 20 to be released.

Figure 5:
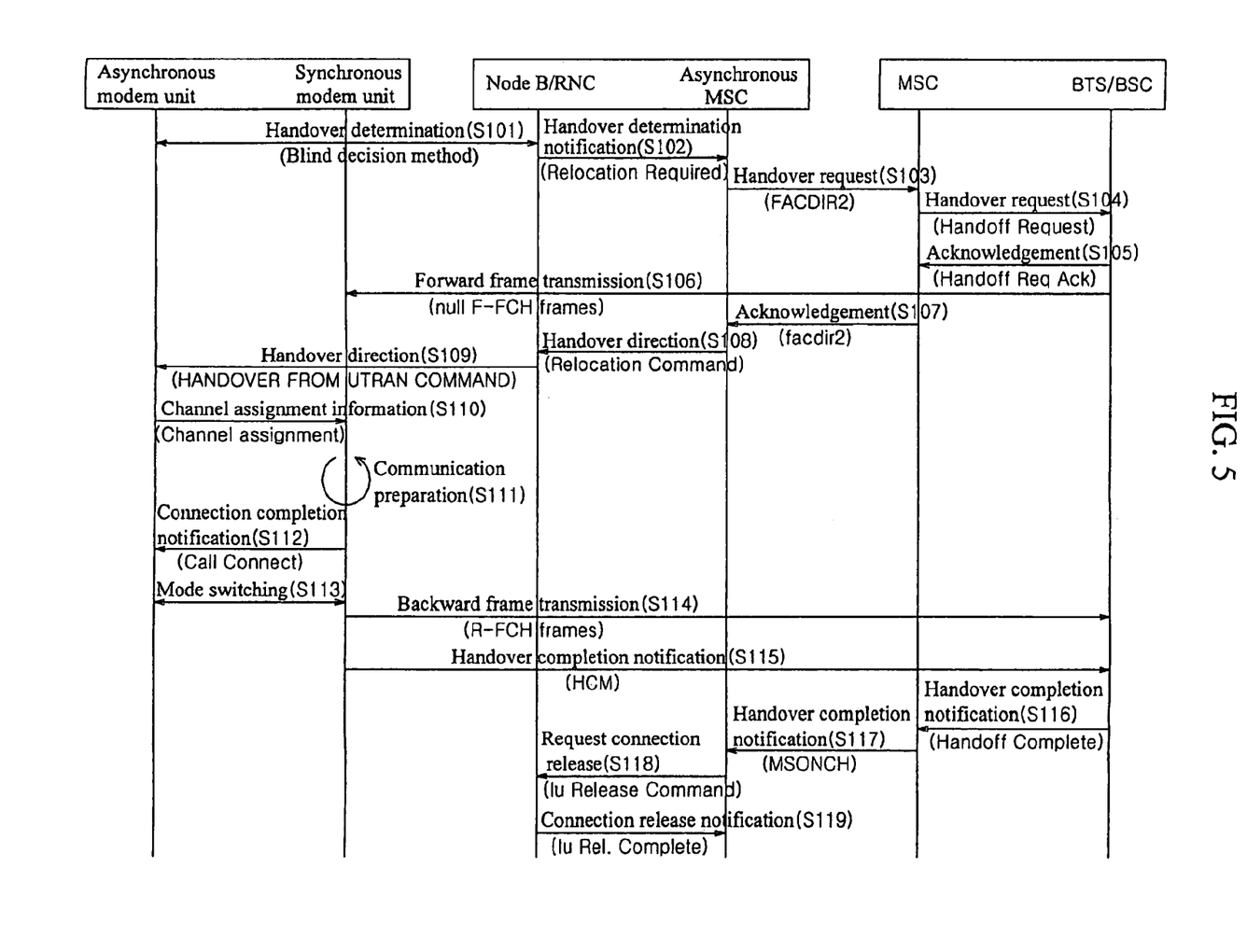
FIG. 5 is a flowchart illustrating the handover method shown in FIG. 4 in detail according to an embodiment of the present invention.

FIG. 5 is a flowchart illustrating the handover method shown in FIG. 4 in detail.

The node B/RNC 210 periodically measures the wireless environment (RTD, BLER, etc.) at the current location of the mobile communication terminal, determines that handover is required when the wireless environment measurement values are less than predetermined threshold values at step S101, and informs the asynchronous MSC 220 of determination results at step S102 (Relocation required). In this case, since the node B/RNC 210 stores information on adjacent base stations in a database, the node B/RNC 210 transmits information on the mobile communication terminal for which handover is required, information on adjacent cells, and information on adjacent base stations together when it is determined that the handover is required.

Accordingly, the asynchronous MSC 220 checks information on the mobile communication terminal for which handover is required, information on adjacent cells and base stations which are received from the node B/RNC 210. And, if it is determined that the handover to the synchronous mobile communication system 30 is required, the asynchronous MSC 220 requests handover from the synchronous MSC 320 at step S103 (FACDIR2).

The synchronous MSC 320 that has received the handover request from the asynchronous MSC 220 requests the handover from the BTS/BSC 310 at step S1104 (Handoff Request) and receives an acknowledgement of the handover request at step S105 (Handoff Req Ack). The BSC 310 allows a forward channel to be assigned to the mobile communication terminal by transmitting null frames to the synchronous modem unit 113 of the mobile communication terminal for which handover is to be performed, through a forward traffic channel at step S106 (null F-FCH frames).

Thereafter, the synchronous MSC 320 transmits an acknowledgement message for the handover request to the asynchronous MSC 220 at step S107 (facdir2), and the asynchronous MSC 220 transmits an acknowledgement message for the handover request to the node B/RNC 210 at step S108 (Relocation Command).

Then, the asynchronous MSC 220 directs the asynchronous modem unit 123 to perform the handover at step S109 (HANDOVER FROM UTRAN COMMAND). The message for the handover direction includes a synchronous mobile communication system-related message, in particular, channel assignment information. The channel assignment information is transmitted from the asynchronous modem unit 123 to the synchronous modem unit 113, and causes the synchronous modem unit 113 to prepare for handover in advance at step S110.

As described above, as the synchronous modem unit 113 receives the channel assignment message and the handover message, the synchronous module 110 performs the step of preparing communication with the synchronous mobile communication system 30 at step S111. When the communication preparation step is completed, the synchronous module 110 notifies the asynchronous modem unit 123 of the completion of the communication preparation at step S112 (Call Connected). When the synchronous module 110 of the mobile communication terminal completes the preparation for the communication with the synchronous mobile communication system 30, mode conversion, such as vocoder switching, between the asynchronous modem unit 123 and synchronous modem unit 113 is performed, and the synchronous modem unit 113 transmits frames to the BTS/BSC 310 of the synchronous mobile communication system 30 through a backward channel at step 114 (R-FCH frames), thus establishing a connection between the mobile communication terminal and the synchronous communication system 30.

Thereafter, the mobile communication terminal informs the BTS/BSC 310 of the completion of the handover at step S115 (Handoff Completion Message: HCM), and the BSC 310 notifies the asynchronous MSC 220 of the completion of the handover through synchronous MSC 320 at steps S116 and S117 (Handoff Complete, and MSONCH).

Accordingly, the asynchronous MSC 220 requests the node B/RNC 210 to release a call at step 118 (Iu Release Command), and the node B/RNC 210 disconnects from the asynchronous modem unit 123 and informs the asynchronous MSC 220 of the completion of the call release, thus establishing a connection between the synchronous modem unit 113 of the mobile communication terminal and the synchronous mobile communication system 30 and completely releasing a connection between the asynchronous modem unit 123 and the asynchronous mobile communication system 20.

Figure 6:
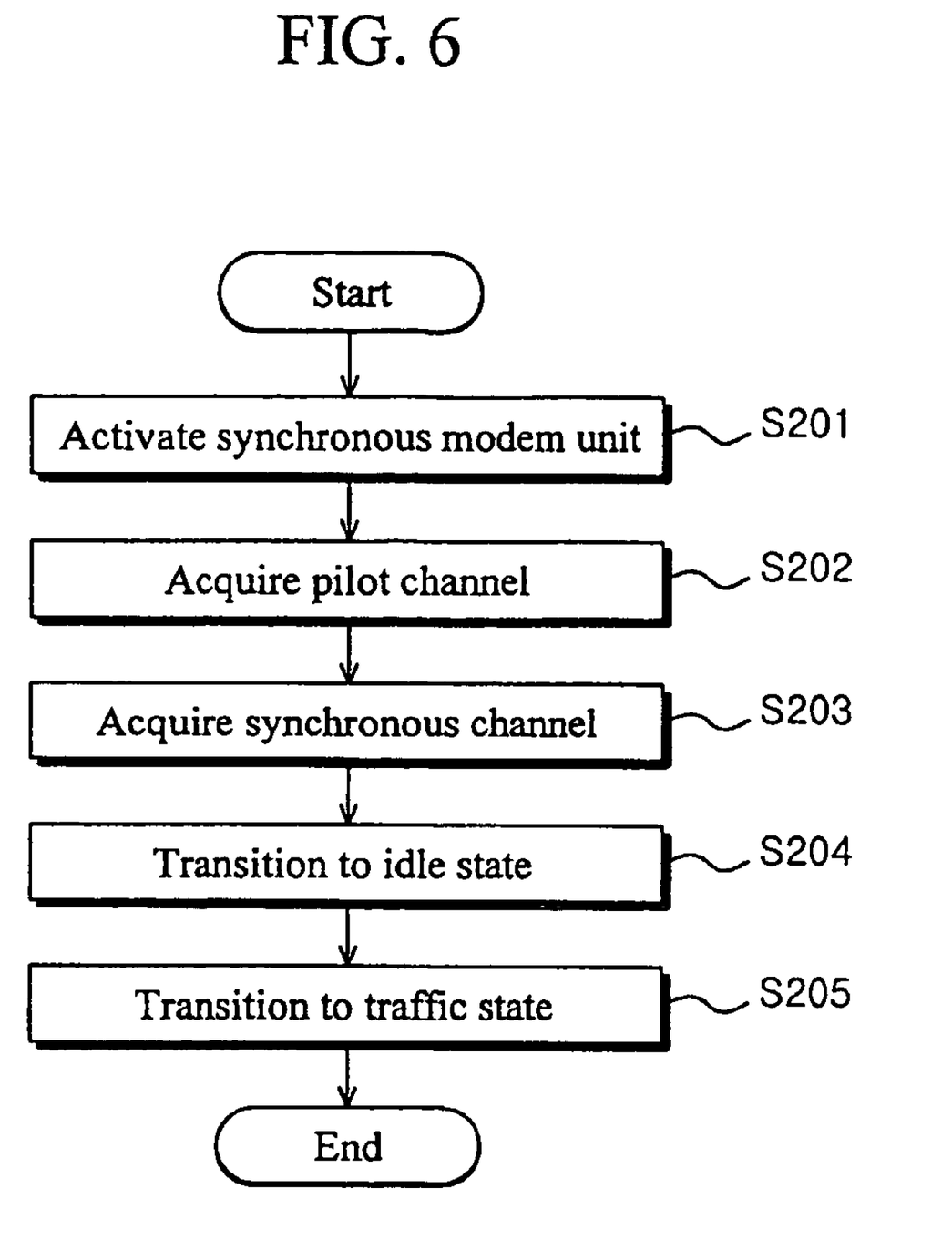
FIG. 6 is a flowchart illustrating the step of preparing communication with the mobile communication terminal shown in FIG. 5 in detail according to an embodiment of the present invention.

FIG. 6 is a flowchart illustrating the step of preparing communication between mobile communication systems shown in FIG. 5 in detail.

The step of preparing communication with the mobile communication terminal described in FIG. 5 is described in more detail below. The synchronous modem unit 113 that has received the channel assignment information from the asynchronous modem unit 123 is activated by switch-on and warm-up operations at step S201, and acquires a pilot channel and a synchronous channel at steps S202 and S203, respectively. The synchronization between the BTS/BSC 310 of the synchronous mobile communication system 30 and the terminal is achieved by acquiring the pilot channel, and timing information and other system information are received from the BTS/BSC 310 by acquiring the synchronous channel. Accordingly, the synchronous module 110 of the mobile communication terminal transitions to an idle state at step S204, does not perform the step of renewing an overhead message from the synchronous mobile communication system to minimize call connection time, and directly transitions to a traffic state, thus establishing a connection to the synchronous mobile communication system 30.

The present invention proposes the method for handover in a mobile communication system in which an asynchronous mobile communication system and a synchronous mobile communication system overlap each other. Mobile communication terminal handover can be divided into handover from an asynchronous area to a synchronous area and handover from a synchronous area to an asynchronous area. Since, in the latter case, an asynchronous mobile communication system overlaps a synchronous mobile communication system and, therefore, uninterrupted service is possible, the latter case has not been considered.

Since, in the former case, the DBDM mobile communication terminal does not request handover by measuring the intensity of the signal from a base station adjacent to the DBDM mobile communication terminal, but the asynchronous mobile communication system determines the handover by measuring the wireless environment around the mobile communication terminal, handover can be conducted without a structural change to the mobile communication terminal, with minimal power consumption.

In the present invention described above, those skilled in the art appreciate that the present invention may be implemented in some other concrete forms without departing from the technical spirit or essential characteristics thereof. Accordingly, it should be understood that the above-described embodiments are illustrative but not restrictive. The scope of the present invention is defined by the appended claims rather than the detailed description, and it should be appreciated that all the modifications derived from the claims and the equivalents thereof are all included in the scope of the present invention.

INDUSTRIAL APPLICABILITY

As described above, the present invention can provide service without a call drop phenomenon when a DMDB mobile communication terminal that is making a voice call moves from an asynchronous mobile communication system area to a synchronous mobile communication system area in a mobile communication system in which an asynchronous mobile communication system and a synchronous mobile communication system overlap each other.

Furthermore, since whether handover is required is determined by the asynchronous mobile communication system without depending on a mobile communication terminal, there are advantages in that a structural change to the mobile communication terminal is not required and the power consumption of the mobile communication terminal is minimized.

The invention claimed is:

1. A handover method between asynchronous and synchronous mobile communication systems for a Dual Band Dual Mode (DBDM) mobile communication terminal in a mobile communication network in which the asynchronous and synchronous mobile communication systems overlap each other, the mobile communication terminal having an asynchronous modem unit and a synchronous modem unit, comprising:
    the first step of a radio network controller of the asynchronous mobile communication system periodically measuring a wireless environment around the mobile communication terminal;
    the second step of the radio network controller determining whether handover is required using a blind decision method when wireless environment measurement values are less than predetermined threshold values, and informing an asynchronous mobile switching center of the asynchronous communication system that the handover is required;
    the third step of the asynchronous mobile switching center requesting handover from a synchronous mobile switching center of the synchronous communication system, and the synchronous mobile switching center assigning a forward channel to the mobile communication terminal;
    the fourth step of, as the asynchronous mobile switching center directs the mobile communication terminal to perform handover, the mobile communication terminal preparing communication with the synchronous mobile communication system, and causing a backward channel with respect to the synchronous communication system to be assigned to the mobile communication terminal; and
    the fifth step of the synchronous mobile switching center informing the asynchronous mobile switching center of completion of the handover, thus releasing a connection between the asynchronous mobile switching center and the radio network controller.

2. The handover method according to claim 1, wherein the wireless environment measurement values comprise at least one of a round trip delay value and a block error rate.

3. The handover method according to claim 1, wherein the third step comprises the steps of:
    the asynchronous mobile switching center requesting handover from the synchronous mobile switching center;
    the synchronous mobile switching center requesting handover from a base station controller of the synchronous mobile communication system, and receiving an acknowledgement message for the handover request;
    the base station controller transmitting null frames to the synchronous modem unit of the mobile communication terminal through a forward traffic channel, and assigning the forward channel to the mobile communication terminal; and
    the synchronous mobile switching center transmitting an acknowledgement message for the handover request to the asynchronous mobile switching center, and the asynchronous mobile switching center transmitting the acknowledgement message for the handover request to the radio network controller.

4. The handover method according to claim 1, wherein the fourth step comprises the steps of:
    the asynchronous mobile switching center directing the asynchronous modem unit of the mobile communication terminal to perform the handover, and transmitting channel assignment information to the asynchronous modem unit;
    the asynchronous modem unit transmitting a handover direction message, including the channel assignment information, to the synchronous modem unit, and causing the synchronous modem unit to prepare the handover;
    the synchronous modem unit preparing for communication with the synchronous mobile communication system upon receiving the handover direction message, and notifying the asynchronous modem unit that the preparation for communication has been completed when the preparation for communication is completed;
    performing mode conversion between the asynchronous modem unit and synchronous modem unit of the mobile communication terminal; and
    the synchronous modem unit transmitting frames to the base station controller of the synchronous mobile communication system through the backward channel, thus causing the mobile communication terminal and the synchronous mobile communication system to be connected.

5. The handover method according to claim 4, wherein the step of the synchronous modem unit of the mobile communication terminal preparing for communication with the synchronous mobile communication system comprises the steps of:
    performing switch-on and warm-up operations of the synchronous modem unit;

acquiring a pilot channel and a synchronous channel from the synchronous mobile communication system;

the synchronous modem unit transitioning to an idle state; and the synchronous modem unit of the idle state transitioning to a traffic state.

6. The handover method according to claim 1, wherein the fifth step comprises the steps of, the mobile communication terminal informing the base station controller of the synchronous mobile communication system that handover has been completed;

the base station controller notifying the asynchronous mobile switching center that handover has been completed though the synchronous mobile switching center of the synchronous mobile communication system;

the asynchronous mobile switching center requesting the radio network controller to release a call; and the radio network controller releasing a connection with the asynchronous modem unit of a mobile communication terminal, and informing the asynchronous mobile switching center that the call has been released.

* * * * *